United States Patent [19]

Hsiung et al.

[11] Patent Number: 4,608,181

[45] Date of Patent: Aug. 26, 1986

[54] WATER FILTRATION APPARATUS HAVING UPFLOW BUOYANT MEDIA FILTER AND DOWNFLOW NONBUOYANT MEDIA FILTER

[75] Inventors: Andrew K. Hsiung; George F. Eaton; Brian W. Hemphill, all of Corvallis, Oreg.

[73] Assignee: Neptune Microfloc, Inc., Corvallis, Oreg.

[21] Appl. No.: 732,892

[22] Filed: May 8, 1985

Related U.S. Application Data

[63] Continuation of Ser. No. 478,991, Mar. 25, 1983, abandoned.

[51] Int. Cl.⁴ .............................................. B01D 23/10
[52] U.S. Cl. .................................. 210/786; 210/795; 210/274; 210/284; 210/286
[58] Field of Search .............................. 210/616–618, 210/786, 792–796, 798, 807, 284, 286, 265, 269, 274–276

[56] References Cited

U.S. PATENT DOCUMENTS

| | | |
|---|---|---|
| 468,984 | 2/1892 | Boeing . |
| 713,759 | 11/1902 | Goade . |
| 2,057,887 | 10/1936 | Elliott et al. . |
| 2,069,621 | 2/1937 | Patrick .............................. 210/794 |
| 2,233,981 | 3/1941 | Jewell . |
| 2,353,602 | 7/1944 | Trotter . |

(List continued on next page.)

FOREIGN PATENT DOCUMENTS

| | | |
|---|---|---|
| 833327 | 4/1960 | United Kingdom . |
| 1147054 | 4/1969 | United Kingdom . |
| 1204880 | 9/1970 | United Kingdom . |
| 1264782 | 2/1972 | United Kingdom . |
| 1305399 | 1/1973 | United Kingdom . |
| 1317433 | 5/1973 | United Kingdom . |
| 2021428 | 12/1979 | United Kingdom . |

OTHER PUBLICATIONS

Simmers, "Buoyant Media Filter", *Proceedings, 40th International Water Conference*, pp. 25–27.

Ohshima, "Amendment Under Rule 312", File History of U.S. Pat. No. 4,115,266, issued Sep. 1978.

U.S. patent application, Ser. No. 175,778, filed Aug. 6, 1980, Kenneth Williamson-Applicant, "Method and Apparatus for Separating Suspended Solids from Liquids".

*Primary Examiner*—Thomas Wyse
*Attorney, Agent, or Firm*—Klarquist, Sparkman, Campbell, Leigh & Whinston

[57] ABSTRACT

A water filtration system is provided by an upflow filter vessel containing a buoyant filter media in series with a downstream downflow filter vessel containing a nonbuoyant filter media. The buoyant media filter vessel and nonbuoyant media filter vessel comprise two compartments of a common tank, separated by a central wall. Water from the upflow filter vessel passes over the top of this wall, or through one or more openings in this wall, to the downflow filter vessel. A common waste trough extends from one end of the tank to the other. Weir plates are fastened to the upper edges of this trough such that the trough steps upwardly in elevation at the central wall. Waste materials from the upflow filter vessel pass over the lower of these weir plates and into the waste trough during cleaning of the buoyant media filter. In contrast, waste materials from the nonbuoyant media filter flow over the upper weir plates and into the trough during cleaning of this latter filter. An adjustment mechanism, such as adjustable weir plates, are provided for adjusting the size of the openings through the central wall to minimize the passage of waste materials from the upflow filter vessel through the opening to the downflow filter vessel during cleaning of the buoyant media filter bed. In addition, a gate may be provided for selectively closing the openings during cleaning of the buoyant media filter to further minimize the pass through of waste material during cleaning of the buoyant media filter.

24 Claims, 14 Drawing Figures

| | | | | | |
|---|---|---|---|---|---|
| 2,572,848 | 10/1951 | Fitch . | 3,698,554 | 10/1972 | Mail . |
| 2,715,964 | 8/1955 | Martin . | 3,701,423 | 10/1972 | Lindstol ............ 210/798 X |
| 2,742,381 | 4/1956 | Weiss et al. . | 3,814,245 | 6/1974 | Hirs . |
| 2,758,070 | 8/1956 | Yurko . | 3,814,247 | 6/1974 | Hirs . |
| 2,878,935 | 3/1959 | Magrath et al. . | 3,846,305 | 11/1974 | Schreiber et al. . |
| 2,925,382 | 2/1960 | Kent et al. . | 3,948,767 | 4/1976 | Chapman . |
| 3,122,594 | 2/1964 | Kielback . | 3,956,128 | 5/1976 | Turner . |
| 3,216,575 | 11/1965 | Stuart . | 4,052,300 | 10/1977 | Mosso ............ 210/786 |
| 3,232,434 | 2/1966 | Albersmeyer . | 4,062,775 | 12/1977 | Pielkenrood . |
| 3,293,174 | 12/1966 | Robjons . | 4,100,070 | 7/1978 | White et al. . |
| 3,305,096 | 2/1967 | Schleiss . | 4,115,266 | 9/1978 | Oshima ............ 210/807 X |
| 3,343,680 | 9/1967 | Rice . | 4,125,467 | 11/1978 | Haddad et al. . |
| 3,424,674 | 1/1969 | Weber . | 4,157,959 | 6/1979 | Wen et al. . |
| 3,446,357 | 5/1969 | Gomella . | 4,198,301 | 4/1980 | Iwatani et al. . |
| 3,459,302 | 8/1969 | Ross . | 4,290,894 | 9/1981 | Török . |
| 3,557,955 | 1/1971 | Hirs et al. . | 4,420,403 | 12/1983 | Tufts ............ 210/807 X |
| 3,635,764 | 1/1972 | Setser et al. . | 4,427,555 | 1/1984 | Brown et al. ............ 210/807 X |
| 3,671,426 | 6/1972 | Orcutt et al. . | 4,446,027 | 5/1984 | Simmers . |

WATER FILTRATION APPARATUS HAVING UPFLOW BUOYANT MEDIA FILTER AND DOWNFLOW NONBUOYANT MEDIA FILTER

This application is a continuation of application Ser. No. 478,991 filed Mar. 25, 1983, abandoned.

BACKGROUND OF THE INVENTION

The present invention relates to methods and apparatus for purification of water by filtration. More specifically, it concerns improved water filtration systems with an upflow filter which contains a buoyant filter media in series with a downstream downflow filter which contains a nonbuoyant filter media. In addition, the invention also concerns an improved apparatus for cleaning such a system.

A prior art water filtration system having an upflow filter with a buoyant filter media followed by a downflow filter with a nonbuoyant filter media is disclosed in U.S. Pat. No. 4,547,286 of Hsiung. In one embodiment of this system, the buoyant media filter and nonbuoyant media filter are separated by a compartment or well. During normal operation of the system, pretreated water from the buoyant media filter flows through the well and to the nonbuoyant media filter. To clean the nonbuoyant media filter, the water level within the well is lowered below the level of the inlet to the nonbuoyant media filter. Air and flush water is then passed upwardly through the filter and to the well. Solids dislodged from the buoyant media filter are carried into the well and withdrawn without reaching the nonbuoyant media filter. In addition, the water level in the well is lowered, and the nonbuoyant media filter is backwashed into the well during cleaning.

This prior art system is capable of producing high quality filtered water at flow rates on the order of 10 gallons per minute per square foot of filter area. Also, in most applications, this system eliminated the need for a pretreatment settling tank or clarifier. Instead, chemicals, such as coagulants, are injected directly into the raw water stream upstream of the buoyant media filter. Flocculation and clarification takes place in this first filter stage. Also, this system monitors water conditions, such as turbidity of the influent or effluent. The result of this monitoring is used to establish and control chemical dosages to minimize the waste of chemicals. Also, chemical savings were realized over systems utilizing a separate settling tank clarifier.

In addition, in this prior art system, partial cleaning of the buoyant media filter with less frequent full cleaning of the nonbuoyant media filter is utilized. Cleaning is accomplished after a predetermined time, or after a predetermined head loss is sensed across the media bed. Solids remaining in the buoyant media filter following partial cleaning enhance flocculation of material from influent raw water, resulting in additional saving of pretreatment chemicals.

Although this prior art water filtration system offers a number of advantages, inefficiencies exist therein, particularly in its cleaning mechanism. Therefore, a need exists for an improved water filtration system having an upflow buoyant media filter and a downflow nonbuoyant media filter.

SUMMARY OF THE INVENTION

A water filtration system is provided by an upflow filter vessel containing a buoyant filter media in series with a downstream downflow filter vessel containing a nonbuoyant filter media. During normal operation of the system, raw water enters the upflow filter vessel through an upflow filter inlet, flows upwardly through the buoyant filter media and reaches an upflow filter vessel outlet. The partially treated water from this buoyant media filter stage is then directed through a downflow filter inlet, flows through the nonbuoyant media filter, and exits from a downflow filter outlet.

As part of the cleaning system of the apparatus, the upflow filter vessel has an upflow filter vessel waste outlet located at a first elevation which is above the elevation of the upflow filter outlet. In addition, the downflow filter vessel has a downflow filter vessel waste outlet at a second elevation which is above the elevation of the upflow filter vessel waste outlet. These two waste outlets communicate with a waste drain system.

During cleaning of the buoyant media filter, the flow of water from the downflow filter outlet is interrupted. Raw water continues to flow into the upflow filter vessel. Consequently, the water level within the upflow filter vessel rises to the level of the upflow filter vessel waste outlet. Air and influent water are used to flush waste materials from the buoyant media filter bed, through this waste outlet, and to the drain system. The influent may also be temporarily interrupted while air is injected into the upflow filter vessel. This air fluidizes and scours the bed to form a slurry. Restarting the influent water flushes the dislodged solids from the upflow filter vessel, as previously mentioned.

In the preferred embodiment, because of the means by which the upflow filter vessel and downflow filter vessel are interconnected, the water level within the downflow filter vessel also rises to the first elevation during cleaning of the buoyant media filter. However, because the downflow filter vessel waste outlet is above this first elevation, partially treated water contained within the downflow filter vessel is not wasted.

To clean the nonbuoyant media filter, backflush water is introduced through the downflow filter vessel outlet. This causes the water level within the downflow filter vessel to rise until it reaches the elevation of the downflow filter vessel waste outlet, at which time waste materials are flushed through this latter outlet to the drain system. The water level within the upflow filter vessel also rises to permit simultaneous cleaning of the upflow filter vessel through its waste outlet at times when the nonbuoyant media filter is cleaned.

In one specific embodiment of the invention, the buoyant and nonbuoyant media filter vessels comprise two compartments of a common tank which are separated by a central wall. Water from the upflow filter vessel passes over the top of this wall, or through one or more openings in this wall, to the downflow filter vessel. A common waste trough extends from one end of the tank to the other. Weir plates are fastened to the upper edges of this trough. These plates step upwardly in elevation at the central wall. During cleaning of the buoyant media filter, waste materials from the upflow filter vessel spill over the lower of these weir plates and into the waste trough. Also, during cleaning of the nonbuoyant media filter, waste materials from the nonbuoyant media filter spill over the upper of these weir plates and into the trough. Thus, the upflow and downflow filter vessel waste outlets are provided by the upper edges of the waste trough when the weir plates are considered as part of the trough.

A more specific feature of the form of the invention in which one or more openings are provided through the central wall, means are provided for adjusting the size of the opening. The openings are adjusted to minimize the passage of waste materials from the upflow filter vessel through the opening to the downflow filter vessel during cleaning of the buoyant media filter bed. More specifically, this last named means may comprise adjustable weir plates positioned along the top and bottom edges of the opening.

As still another more specific feature of the invention, the waste trough is centrally located. In addition, at least two such openings are provided through the wall, one being located along each side of the waste trough. Also, the means for adjusting the size of the openings comprises upper and lower weir plates. The lower of such plates are provided to adjust the elevations of the bottom of the openings to match each other so that an equal volume of water flows through each opening. In addition, the upper of such weir plates are utilized to pinch off the opening to the minimum size required for the desired volume of water to pass through the opening so as to minimize undesired pass through of solids from the upflow filter vessel to the downflow filter vessel during cleaning of the buoyant media filter bed.

As a still further feature of the invention, gate means is provided for selectively closing the openings during cleaning of the buoyant media filter to further minimize the passage of waste materials from the upflow filter vessel to the downflow filter vessel during cleaning of the buoyant media filter.

It is, accordingly, one object of the invention to provide an improved water filtration apparatus having an upflow buoyant media filter followed by a downstream downflow nonbuoyant media filter.

It is another object of the invention to provide a water filtration apparatus which can operate at a high flow rate and which rapidly can be cleaned and returned to service after cleaning.

It is a further object of the invention to provide such a water filtration system which minimizes the time, flush water, and energy required during cleaning.

A further object of the invention is to provide a compact water treatment system.

Another, more specific object of the invention is to provide a multi-staged passive water treatment system in which expensive control valves and other complex mechanical elements are eliminated between the influent inlet and effluent outlet of the system.

A related object is to provide a plurality of such systems which operate in tandem so that filtering processes can proceed uninterrupted while one filter unit is being cleaned.

These and other features, objects, and advantages of the invention will be apparent from the following detailed description thereof and from the attached drawings.

Figure 1:
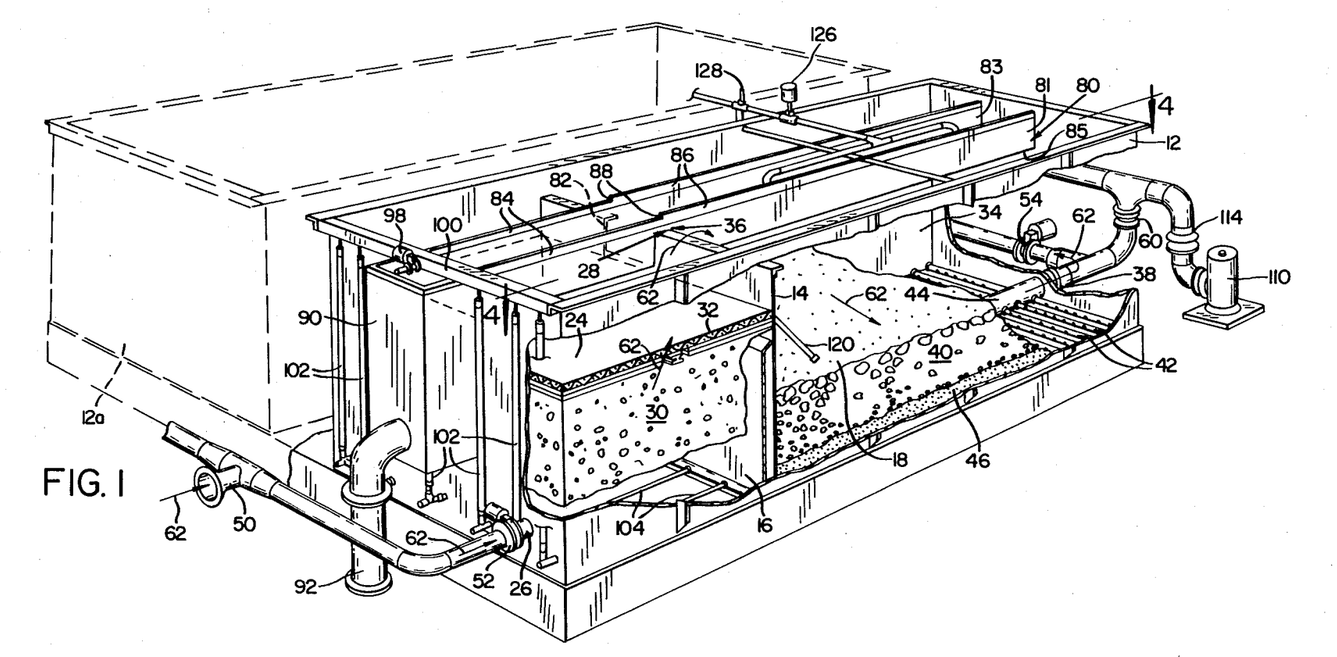
FIG. 1 is a perspective view of one embodiment of a filter system according to the present invention shown partially in section.
Figure 2:
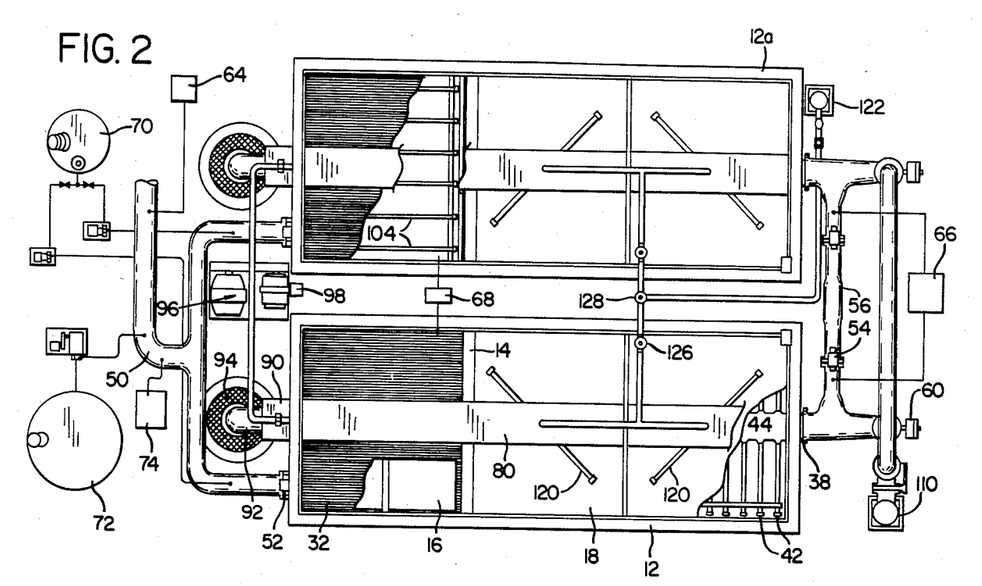
FIG. 2 is a top plan view of the filter system shown in FIG. 1.
Figure 3:
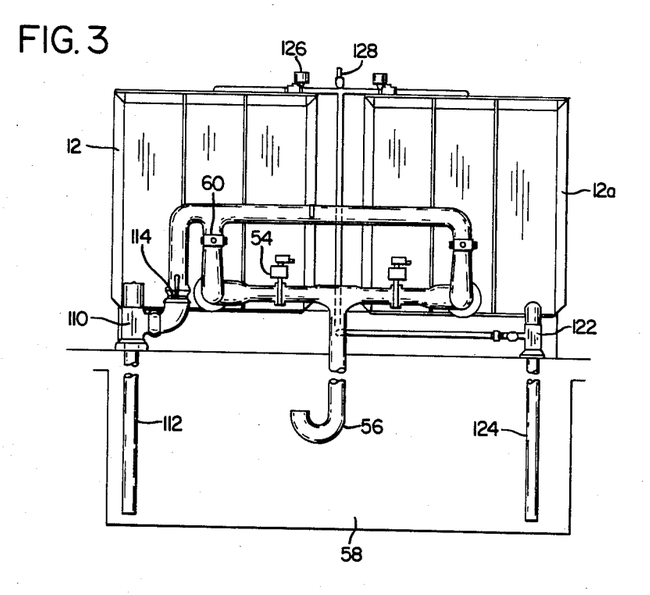
FIG. 3 is an end elevation view of the effluent end of the system of FIG. 1.

DETAILED DESCRIPTION OF FILTER SYSTEM OF FIGS. 1, 2, AND 3

With reference to FIG. 1, a water filtration system in accordance with the invention comprises a hollow, rectangular tank 12 which is separated by an internal, upright wall 14 into an upflow filter compartment or vessel 16 and a downflow filter compartment or vessel 18. In a typical water treatment plant, two or more tanks 12, 12a are provided in tandem. Therefore, while the filters in one such tank are being cleaned, the filters in the other tank are operational so that the plant continuously treats water.

The upflow filter vessel 16 provides an internal passageway 24 for water moving therethrough. An inlet 26 is provided near the base of a vessel 16 for supplying influent raw water into the passageway 24. An outlet 28 is located near the top of the vessel, in this case over the top of the center wall 14, for removing partially filtered water from the passageway 24.

Located between the inlet 26 and the outlet 28 is a bed of buoyant media particles 30 which collects impurities as water to be filtered moves upwardly through the bed. This media must have a specific gravity less than that of water and should have a specific gravity of no less than 0.80. Most preferably, the media particles should have a specific gravity of no less than 0.90.

To achieve effective filtration, a media of proper characteristics is chosen depending upon the nature of the raw water to be filtered. For example, the media should have an effective size of between 1.5 and 20 mm; but optimal filtration of storm water or of effluent from a biological treatment clarifier, requires a media having an effective size of between about 2.0 and 10.0 mm in diameter. Such particles typically have a uniformity coefficient of no greater than 2.0, and a sphericity of less than 0.7. One example of a suitable bed material comprises angularly shaped polypropylene pellets with a specific gravity of 0.90, effective sizes of 2.5 mm, and a uniformity coefficient of about 1.8. Of course, other suitable media may be utilized.

A horizontal buoyant media retaining apparatus such as a screen 32 positioned across an upper region of the filter vessel 16 prevents passage of the buoyant filter media outwardly through the outlet 28. Screen 32 is constructed so that it may be easily removed from above for cleaning purposes.

The downflow filter vessel 18 also provides an internal passageway 34 for water moving therethrough. An inlet 36, communicating with the upflow filter vessel 28 over the top of a wall 14, is provided for supplying partially filtered water from the upflow filter vessel into the passageway 34. An outlet 38 is located near the bottom of the downflow vessel for removing filtered water from the passageway 34.

Located between the inlet 36 and outlet 38 is a bed of nonbuoyant media particles 40 which filters impurities as the water moves downwardly through the bed. Preferably, the bed 40 comprises a mixed media filter, such as shown in U.S. Pat. No. 3,343,680. Such a bed is hydraulically graded from coarse to fine in the direction of filtration. As a more specific description, an exemplary bed is approximately 30 inches deep and is composed of three or four materials, each of a different size and specific gravity, so as to provide a uniform void distribution through the bed in the direction of filtration.

Conventional water collection laterals 42 and header or main line 44 are positioned at the lower region of the bed 40 and lead to the downflow filter vessel outlet 38. These water collector lines are covered by a layer of gravel 46. The uppermost region of this gravel layer is of high density. This aids in stabilizing the gravel bed when backflush water passes upwardly from the laterals 42 during cleaning of the nonbuoyant media filter bed.

During normal operation, raw water to be treated is fed through a conduit 50 (FIG. 2) and an open flow control valve 52 to the upflow vessel inlet 26. Water entering inlet 26 flows upwardly through the buoyant media bed, over the top of the wall 14, and downwardly through the nonbuoyant media filter bed to the downflow filter vessel outlet 38. From outlet 38, the treated water passes though an open effluent flow rate control valve 54 and to an effluent drain line 56 (FIG. 3) which leads to a clear well 58. At this time, a backwash valve 60 is closed to prevent the flow of backwash water to the outlet 38 of the downflow filter compartment. Arrows 62 (FIG. 1) indicate the flow of water through the system under these conditions.

With reference to FIG. 2, one or more chemical feed devices are provided for injecting chemicals directly into the raw water stream as it passes through the conduit 50. For example, a polymer feed device 70 may be provided for injecting coagulant into the raw water stream, an alum feed device 72 may be provided for injecting aluminum sulfate into the raw water stream, and another such device 74 may be provided for injecting lime or soda ash into the raw water stream to alter its pH. Of course, other chemicals and materials may be injected, depending upon the characteristics of the water being treated. For example, powdered activated carbon may be added to remove undesirable taste and odors from the water.

Turbidity and other characteristics of the raw water may be monitored upstream of the filter compartment 16. In addition, these characteristics may also be monitored in the effluent line. Turbidity meters or other conventional monitoring devices 64, 66 are provided for this purpose. A sensor 68 may also be provided for monitoring the pH of the treated water. This monitoring of water characteristics facilitates close control of chemical dosage to minimize the waste of expensive treatment chemicals. For example, an operator can adjust the rate of coagulant supplied from the chemical feed device 70 in the event of a variation in the turbidity of the influent or effluent water.

Lower coagulant dosages are required for separation of solids using a buoyant media filter rather than a settling-type clarifier. Furthermore, with an upflow buoyant media filter and downflow nonbuoyant media system, flocculation and clarification of the raw water takes place within the buoyant media filter. This eliminates the need for settling-type clarifier and results in a much more compact system.

The cleaning apparatus for the water filtration system of FIG. 1 will next be described. It is important that the upflow filter vessel compartment be provided with a waste discharge outlet which is at an elevation above the upflow filter vessel outlet 28. In addition, the downflow filter vessel is provided with a waste outlet at an elevation which is above the elevation of the upflow filter vessel waste outlet.

To accomplish this, in the illustrated preferred embodiment, a waste and overflow trough 80 is provided within an upper region of the tank 12 and extends lengthwise from one end of wall of the tank 12 to the opposite end wall. The trough 80 has upright side walls 81, 83 and a base 85, and is centrally positioned within the tank. The wall 14 is cut out at 82 for passage of the trough therethrough. Adjustable weir plates are mounted to the respective upper edges of the trough. A first set of such weir plates 84 are mounted to the trough in the region above the upflow filter compartment 16, while a second set of weir plates 86 are mounted to the trough above the downflow filter compartment 18. The weir plates 86 are higher than the weir plates 84 so that, in essence, the trough steps up at 88.

As explained below, during cleaning of the buoyant media bed, waste material and water flow over the weir plates 84 and into the trough 80. Similarly, during cleaning of the nonbuoyant media bed 40, waste materials and water flow upwardly over the higher weir plates 86 and into the trough 80. Thus, for purposes explained below, the waste outlet from the filter vessel 18 is effectively at a higher elevation than the waste outlet from the filter vessel 16. From trough 80, the waste flows into a well 90 at one end of the tank 12, through a conduit 92, and to a sump 94 (FIG. 2).

An air scouring system is also provided for cleaning the buoyant media bed. With reference to FIGS. 1 and 2, this air scouring system includes an air supply 96, including a blower coupled to an air control valve 98, which in turn is connected to a manifold 100 (FIG. 1). Plural upright air supply tubes 102 deliver air from the manifold to respective perforated air delivery laterals 104 located beneath the buoyant media filter bed. When air from laterals 104 flows upwardly through the bed, the bed expands and is scoured by the air so that solids trapped therein are dislodged and carried outwardly through the trough 80 as explained below.

A mechanism is also provided for cleaning the nonbuoyant media bed 40. With reference to FIGS. 1 and 3, this latter bed cleaning apparatus includes a backwash pump 110 for pumping cleaning water, via a conduit 112, from a clear well or backflush water tank 58. The pumped flush water passes through a backflush rate control valve 114 and through the backflush valve 60 to the downflow filter vessel outlet 38. From outlet 38, the backflush water flows through the line 44, the laterals 42, and upwardly through the nonbuoyant media bed to the trough 80. During times when the backflush valve 60 is open, the effluent line valve 54 (FIG. 3) is closed to prevent cycling of the backflush water directly to the clear well 58.

In addition, the downflow filter vessel is provided with one or more conventional rotary filter surface agitators 120 for delivering jets of water to the surface of the nonbuoyant media bed. These water jets break up the mat of solids deposited on the bed and facilitates its cleaning. A surface wash pump 122 pumps water through a conduit 124 from the clear well, through a surface wash valve 126, and to the rotary agitators 120 at times when the fixed media bed is cleaned. A vacuum release valve 128 is also provided in the surface wash supply line leading from the pump 122 to the valve 126.

OPERATION OF THE FILTER SYSTEM OF FIG. 1

Figure 4:
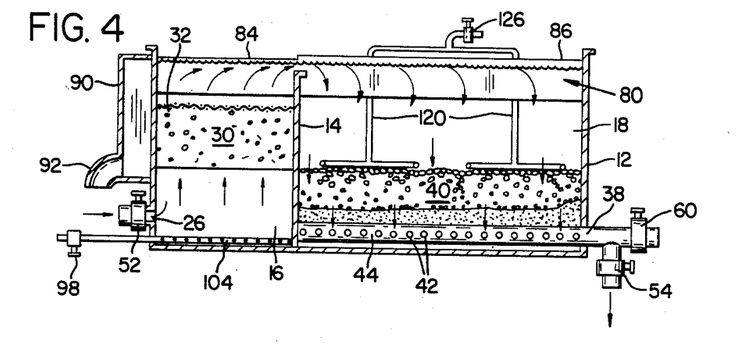
FIG. 4 is a vertical section view of the system of FIG. 1, taken along line 4—4 thereof, and showing water being treated.
Figure 5:
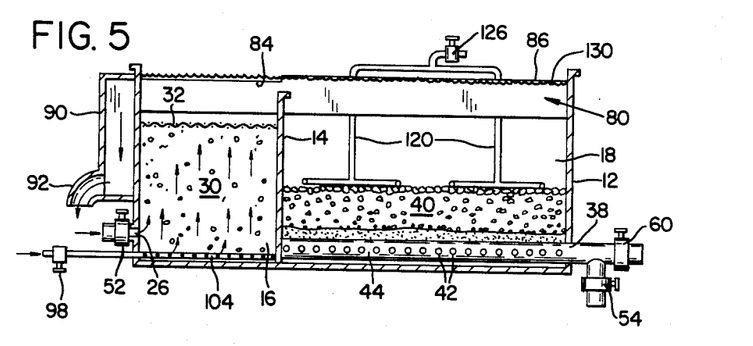
FIG. 5 is a vertical section view of the system of FIG. 1, taken along line 4—4 thereof, and showing the buoyant media filter being cleaned.
Figure 6:
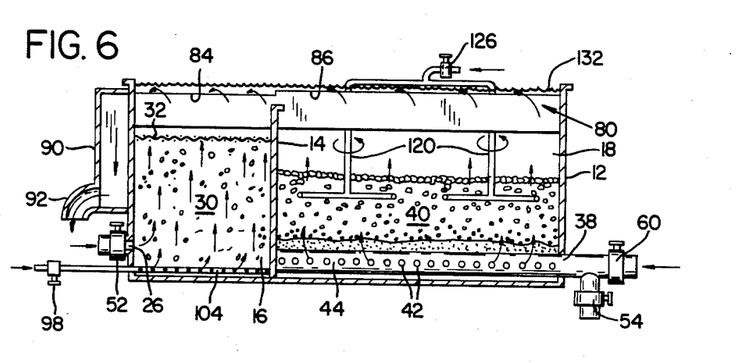
FIG. 6 is a vertical section view of the system of FIG. 1, taken along line 4—4 thereof, and showing the nonbuoyant media filter being cleaned.

With reference to FIGS. 4, 5, and 6, the operation of the water filtration system of FIG. 1 will be described.

During normal operation, as shown in FIGS. 1 and 4, raw influent water enters the filter vessel 16 through inlet 26. This water flows upwardly through the buoyant media bed 30, over the top of the wall 14, and into the downflow filter vessel 18. From there, the water passes through the nonbuoyant media bed 40, laterals 42, main line 44, and to the downflow filter vessel outlet 38. At such times, the backflush water supply valve 60 is closed while the effluent line oulet valve 54 is open. Consequently, the treated water flows from the outlet 38 into the clear well 58 (FIG. 3).

The bulk of the filtration takes place in the buoyant media filter. Depending upon water conditions, typically anywhere from 70% to 95% of suspended material is removed from the raw water by the buoyant media filter. Through mixing, contact flocculation, and turbidity removal, the buoyant media filter provides an efficient initial treatment of the raw water. Because of the quantity of material removed in this first filter stage, it is desirable to clean the buoyant media filter more frequently, and independently of, the nonbuoyant media filter. This increases the amount of time that the system may operate between runs, that is, between cleaning of the nonbuoyant media filter. Partial cleaning of the buoyant media filter is apparently all that is required to maintain the system in continuing operation. During such partial cleaning, some of the deposited solids that are carried out from the filter by way of the trough 80, as explained below, while others are merely redistributed within the filter bed. Eventually, a steady state or equilibrium condition is reached, wherein each cleaning cycle removes a fixed amount of solids from the buoyant media filter bed. Because of this partial cleaning, and because of the efficient cleaning system utilized in the present invention, less flush time, flush water, and air are required during the cleaning process. In addition, there is less waste water from cleaning that has to be disposed of.

Another advantage of partial cleaning is that flocculation within the buoyant media filter is enhanced by contact with previously deposited solids which remain in the filter, even after it is cleaned. Thus, fewer floc chemicals are required. Also, it is advantageous to leave a certain amount of deposited solids in a buoyant media filter, as the solids reduce the size of the pores of the filter and assist in filtration.

Typically, partial cleaning of the buoyant media filter is accomplished sporadically, or at periodic predetermined time intervals, or in response to conventional pressure sensors which sense a change in head loss through the buoyant media filter.

With reference to FIG. 5, in a typical application, following partial cleaning of the buoyant media filter and at a flow rate of approximately 10 gallons per minute per square foot of filter area, the head loss is from 0.7 to one foot. If sufficient solids are deposited within the bed so as to increase the head loss across the bed to, for example, four feet, then partial cleaning of the buoyant media filter may be accomplished as follows.

The plant effluent valve 54 is temporarily closed. At the same time, the raw water influent valve 52 remains open. As a result, the water within the compartment 16 rises. In addition, the water within compartment 18 also rises because of the open communication between these two compartments over the central wall 14.

After the water rises to a predetermined level within the compartment 16, as sensed by a level switch (not shown) the influent valve 52 temporarily closes. The air inlet valve 98 is then opened, and the blower of air supply 96 turns on. Air is then distributed from the laterals 104 and upwardly through the buoyant media bed. This upwardly flowing air causes the bed to expand and fluidize. Furthermore, the air scours excess solids from the buoyant media bed and forms a slurry within the upflow compartment 16. After a short delay to enable the formation of the slurry, the influent valve 52 reopens so that raw water again enters the compartment 16. Cleaning may also be accomplished without halting the influent water flow.

Under these conditions, when the water reaches the top of weir plates 84, it spills over the lip of these weir plates and into the trough 80. From trough 80, the wastes are carried to the well 90 and through conduit 92 to the waste water sump. This water flushes dislodged solids from the buoyant media filter. However, because of the lower elevation of the weirs 84 in comparison to the weirs 86, the water level as indicated by number 130 remains below the top of the weir plates 86. Consequently, during cleaning of the buoyant media bed, partially treated water from the downflow filter vessel 18 is not lost. In addition, there is very little undesirable carryover of solids from the buoyant media bed across the top of the wall 14 and into the downflow filter vessel 18. This is because, in effect, a wall of water above the wall 14 acts as a plug to minimize this solids transfer.

Cleaning of the buoyant media bed typically takes about two to five minutes. Following cleaning, the air flow is stopped, the effluent valve 54 is reopened, and normal operation of the water treatment system continues.

With this cleaning system, it is unnecessary to use water flowing at other than the normal influent flow rate for cleaning purposes. Thus, there is no need for a separate backwash pump and backwash water storage system for cleaning the buoyant media filter. Also, the degree of solids flushing from the buoyant media filter depends upon the total wash volume. This flushing can be completed at any flow rate, with the duration of the cleaning being adjusted, depending upon the influent flow rate. Furthermore, such cleaning is almost totally temperature insensitive. Therefore, the flush rate does not have to be adjusted for changing water temperatures.

The retaining screen 32 is of a corrosion resistant material which allows passage of the dislodged solids therethrough, but retains the bed in place. Retainer 32 is automatically scoured during each flush cycle to prevent it from clogging. In addition, it can be easily removed from above for cleaning purposes.

Complete cleaning of the nonbuoyant media filter will be described with reference to FIG. 6. Conventional water level sensors are provided within the downflow filter compartment 18 to maintain the water level within this compartment at a constant level. Under such conditions, as solids collect within the nonbuoyant media filter, the resulting head loss across this filter produces a correspondingly lower pressure in the header line 44. A conventional pressure switch (not shown) senses a predetermined low pressure to start the nonbuoyant media backwash cycle. Of course, this bed may be sporadically cleaned, or cleaned at predetermined time intervals as well.

Upon commencement of the cleaning cycle, the effluent valve 54 is closed while the influent valve 52 remains open. Consequently, the water level within both the compartments 16 and 18 rises. Once the water level rises to a predetermined level as determined by level switches (not shown), valve 126 is opened to supply surface wash water to the rotatable agitators 120. Water from these agitators breaks up a mat of deposited solids collected on the surface of the nonbuoyant media filter. These agitators facilitate quick fluidization and a bed expansion, as well as providing auxiliary agitation in the scrubbing of the bed particles. Typically, one-half to one gallon of water per minute per square foot of filter bed is provided through these agitators. Thereafter, the backwash pump 110 is started while valve 60 is opened. Clean water from the clear well 58 is pumped at a controlled rate to the downflow filter compartment 18, the rate being determined by the setting of backwash rate control valve 114 (FIG. 1). The rate of flushing is determined in a conventional manner, is temperature-sensitive, and is typically established at fifteen gallons per minute per square foot of filter area at 60° F. The backwash water flows upwardly from the laterals 42 and through the nonbuoyant media bed 40. Under these conditions, the nonbuoyant media bed fluidizes and expands by approximately twenty percent. Also, the filter particles within the bed roll and scrub against each other to dislodge deposited solids. As can be seen in FIG. 6, the water level rises above the level of the weir plates 86 so that the solids and water from the compartment 18 pass over these weir plates, into the trough 80, and then to the waste system.

Typically, the buoyant media filter bed is cleaned simultaneously with the cleaning of the nonbuoyant media filter bed. In such a case, the cleaning steps for the buoyant media filter bed proceed as previously described.

Thus, the cleaning system of this invention uses a common waste water trough in cleaning both the nonbuoyant and buoyant media bed, thereby eliminating an otherwise expensive duplication of equipment. In addition, the number of valves and pumps utilized in the cleaning system are minimized, reducing the cost of the overall system.

Also, with this arrangement of cleaning system, an extremely compact water filtration system apparatus is provided.

FILTRATION SYSTEMS OF FIGS. 7 THROUGH 11

Figure 7:
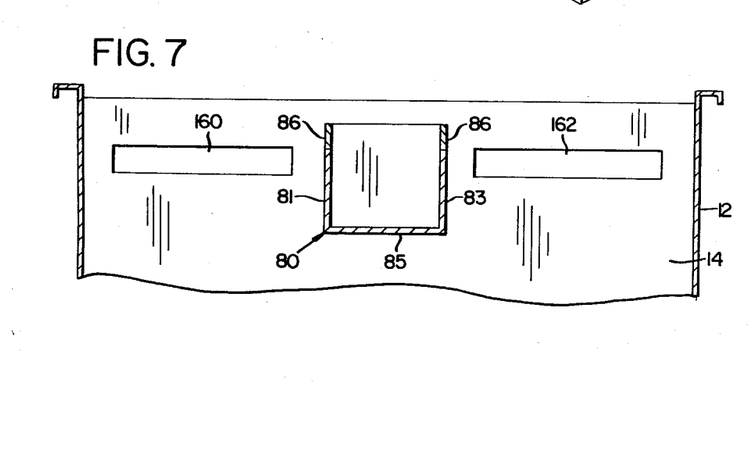
FIG. 7 is a side elevation view of a portion of a central wall of an alternate embodiment of a water treatment system in accordance with the invention.

FIG. 7 illustrates a modification to the water filtration system of FIG. 1. In this embodiment, the central wall 14 is provided with at least one, and in the illustrated case, two openings 160, 162 communicating between the upflow filter compartment 16 and the downflow filter compartment 18. In addition, these openings are positioned below the elevation of the weir plates 84, 86 but in an upper region of the wall. Also, the upper end of the wall 14 is extended upwardly to prevent the flow of water over the top of the wall between the compartments. Instead, the partially treated water from the compartment 16 flows through the respective openings 160, 162 and into the compartment 18 during the water filtration operation.

By restricting the size of such openings to the minimum size required for normal operation of the system, the area of direct communication between the compartments 16 and 18 is reduced. Consequently, during cleaning of the buoyant media filter, the undesired pass through of dislodged solids from upflow compartment 16 into downflow compartment 18 is reduced. Otherwise, the embodiment of FIG. 7 operates in the same manner as that of FIG. 1.

Figure 8:
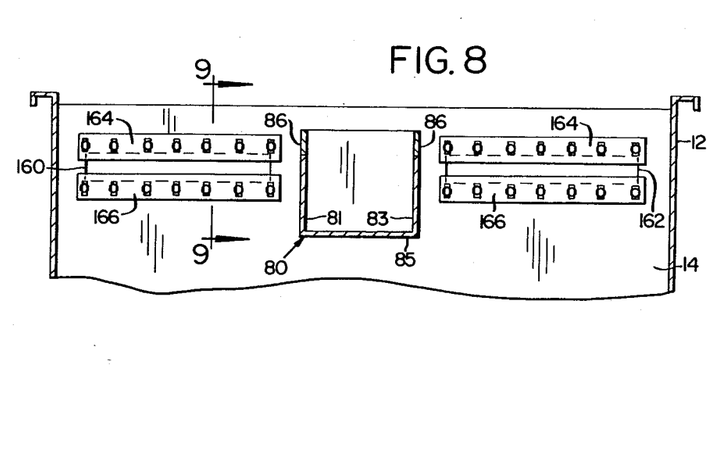
FIG. 8 is a side elevation view of the wall of FIG. 7 with adjustable weir plates partially covering the openings through the wall.

The embodiment shown in FIG. 8 is similar to the embodiment of FIG. 7, except that an adjustable mechanism is provided for selectively altering the size of the openings 160, 162. This mechanism is provided to minimize the size of these openings for added reduction of the undesired pass through of solids between the filter compartments during cleaning of the nonbuoyant media filter. In the illustrated form, this mechanism comprises a separate set of upper and lower weir plates 164, 166, each set being associated with a respective one of the openings 160, 162.

Figure 9:
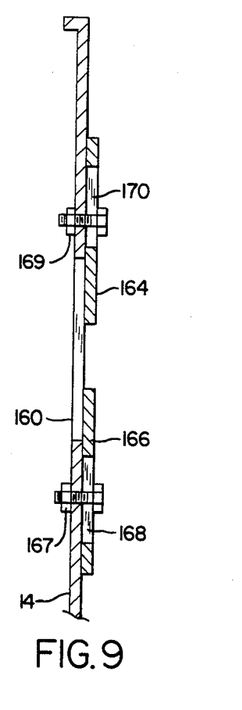
FIG. 9 is a vertical section view of a portion of the wall of FIG. 8, taken along line 9—9 thereof.

As can be seen from FIG. 9, fasteners such as bolts 167 are provided for mounting the weir plate 166 to the wall 14 so as to cover a lower portion of the associated opening. Similar fasteners 169 are provided for mounting the weir plates 164 in place so as to cover an upper portion of the associated opening. Elongated slots 168, one being associated with each fastener, are provided in the weir plates 166 to permit raising and lowering of these plates when the fasteners are loosened. Similar slots 170 are provided in the weir plates 164. Thus, the weir plates are adjustable in elevation.

During operation, the lower weir plates 166 are adjusted until their upper edges are at the same elevation. This equalizes the volume of water flowing over each of these weir plates. In addition, once the system is operational, the upper weir plates 164 are lowered until their lower edges barely impinge the flowing water stream. They are then fastened in this position. This establishes the openings 160, 162 at their minimum size for normal operation of the system. When so established, the undesired pass through of solids during cleaning of the buoyant media bed though the opening is reduced.

Figure 10:
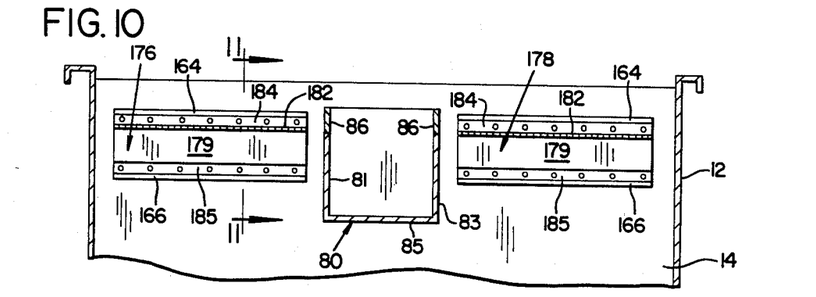
FIG. 10 is a side elevation view of the wall of FIG. 7 with gates covering the openings through the wall.
Figure 11:
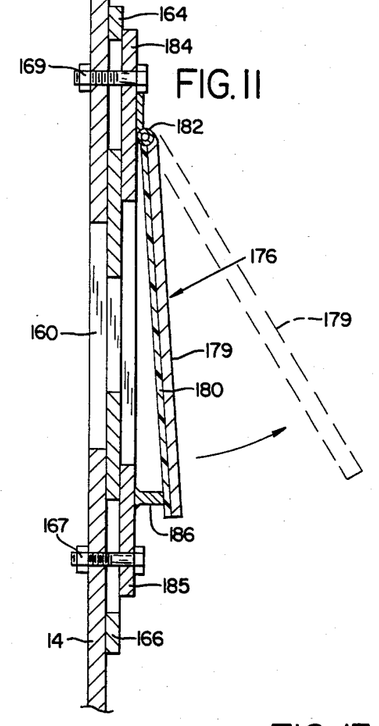
FIG. 11 is a vertical section view of a portion of the wall of FIG. 10, taken along line 11—11 thereof.

FIGS. 10 and 11 illustrate a further modification to the embodiment of FIGS. 8 and 9. In the embodiment of FIG. 10, a flap gate 176 overlies the opening 160 while a similar flap gate 178 overlies the opening 162. With reference to FIG. 11, the flap gate 176 comprises a plate 179 having a gasket or seal 180 mounted to the wall side of the plate. A hinge 182 secures the plate to a frame 184 which in turn is fastened by the fasteners 169, 167 to the wall 14. A lower frame portion 185 is also shown. The adjustable weir plates 164, 166 may also be included in this construction, as shown in FIG. 9. A gate seat 186 limits the downward tilting of the gate 176 to an inclined position.

OPERATION OF THE EMBODIMENTS OF FIGS. 7 THROUGH 11

Each of the embodiments of FIGS. 7 through 11 operate in the manner described above in connection with the embodiment of FIG. 1, except that water flows through the openings 160, 162 provided in the wall 14, rather than over the top of the wall.

Figure 12:
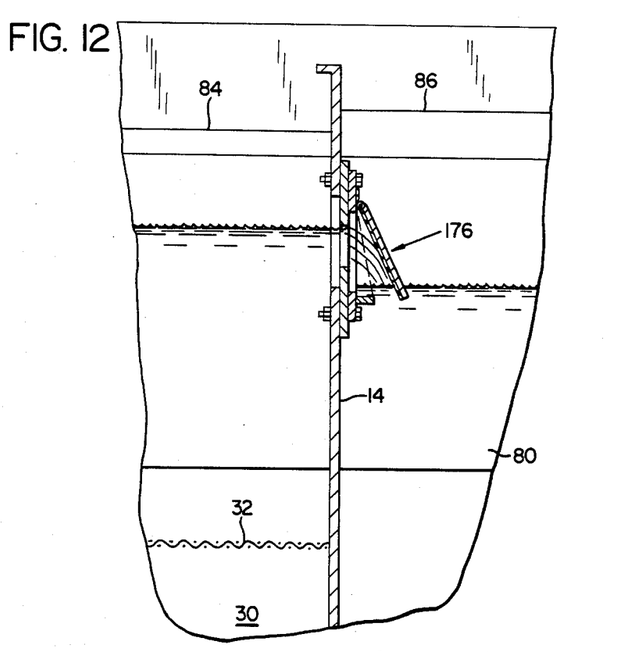
FIG. 12 is a vertical section view of the center wall portion of an alternate form of water treatment system in accordance with the invention, showing water being treated.

For example, FIG. 12 illustrates a system, including the flap gate of FIG. 11, during normal water filtration operation. Water flowing upwardly through the buoyant media filter bed 30 passes through the opening 160, between the upper and lower weir plates 164, 166, and pushes aside the flap gate 176 as it enters the downflow filter compartment 18. Filtering is accomplished in the same manner as described above in connection with FIG. 1.

Figure 13:
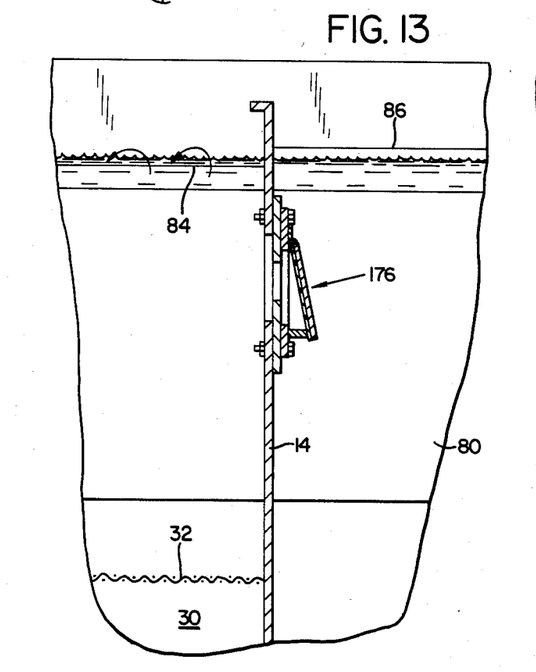
FIG. 13 is a vertical section view of the system of FIG. 12, showing the buoyant media filter being cleaned.

During cleaning of the buoyant media filter, as shown in FIG. 13, the flap valve 176 falls to a closed position under the influence of gravity. This minimizes the undesired pass through of solids dislodged from the buoyant media bed during cleaning.

Figure 14:
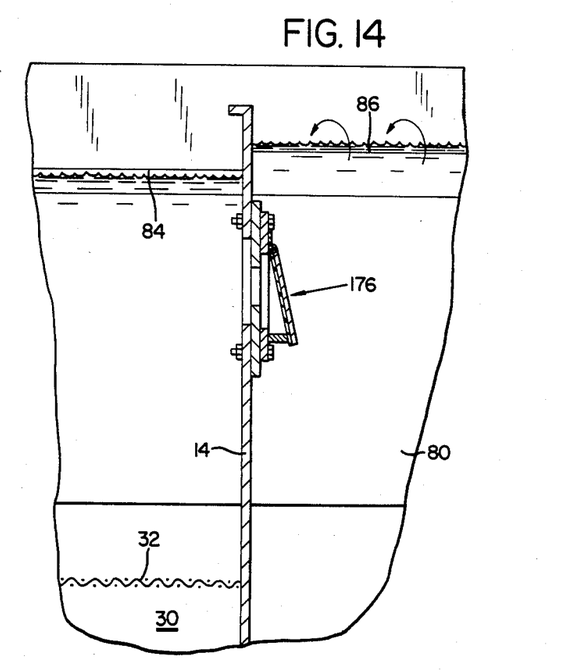
FIG. 14 is a vertical section view of the system of FIG. 12, showing the nonbuoyant media filter being cleaned.

When the nonbuoyant media bed is cleaned, as shown in FIG. 14, the gate again closes and is held closed due to the influence of gravity. Also, closing of the gate is assisted by the differential in head resulting from the different water levels at the downflow filter side of the wall 14 in comparison to the water level at the upflow filter side of the wall. Although not shown in FIG. 14, the buoyant media filter bed may be simultaneously cleaned.

Also, a small amount of water from a source (not shown) may be introduced into the downflow filter compartment 18 at times when buoyant media filter bed 30 is being cleaned. This would raise the water level within the downflow filter vessel, producing a differential in head on opposite sides of the wall 14. This would tend to hold the flap gate 176 closed during cleaning of the buoyant media bed.

Therefore, an extremely efficient water filtration system is disclosed in accordance with this invention, and particularly one in which cleaning of the system is easy to accomplish.

Having illustrated and described the principles of our invention with reference to several preferred embodiments, it should be apparent to those persons skilled in the art that such invention may be modified in arrangement and detail without departing from such principles. We claim as our invention all such modifications as come within the true spirit and scope of the following claims.

We claim:

1. A filter apparatus comprising:
   a hollow elongated upright tank;
   an internal upright wall separating the interior of the tank into an upflow filter vessel and a downflow filter vessel,
   said upflow filter vessel having an upflow filter inlet, an upflow filter outlet located above the upflow filter inlet, and defining an upflow passageway for liquid from the upflow inlet to the upflow outlet;
   an amount of buoyant particulate filter media in the upflow filter vessel sufficient to form a buoyant filtration bed in the upflow passageway between the upflow inlet and upflow outlet,
   said downflow filter vessel having a downflow filter inlet coupled to said upflow filter outlet, a downflow filter outlet located below the downflow filter inlet, and defining a downflow passageway for liquid from the downflow inlet to the downflow outlet;
   an amount of nonbuoyant particulate filter media in the downflow filter vessel sufficient to form a nonbuoyant filtration bed in the downflow passageway between the downflow inlet and outlet,
   said upflow filter vessel having an upflow filter vessel waste outlet at a first elevation which is above the elevation of the upflow filter outlet,
   said downflow filter vessel having a downflow filter vessel waste outlet at a second elevation which is above the elevation of the upflow filter vessel waste outlet; and
   drain means coupled to said upflow and downflow filter vessel waste outlets,
   said drain means comprising a waste trough having upright first and second side walls and a base, said waste trough extending lengthwise within an upper region of said tank so as to position at least a portion of said trough within the upflow filter vessel and at least a portion of said trough within the downflow filter vessel, at least a portion of one of said side walls comprising a first spill over wall and being positioned within the upflow filter vessel at the first elevation so as to comprise the upflow filter vessel waste outlet, at least a portion of one of said side walls comprising a second spill over wall and being positioned within the downflow filter vessel at the second elevation so as to comprise the downflow filter vessel waste outlet.

2. A filter apparatus according to claim 1 in which said waste trough extends from end to end of said tank, the side walls of said trough stepping up where the trough crosses the internal upright wall such that the portions of the first and second side walls of the trough at the downflow filter vessel side of the internal wall are at the second elevation and the portions of the first and second side walls of the trough at the upflow filter side of the internal wall are at the first elevation.

3. A filter apparatus according to claim 1 in which the upper edge of the internal wall is at an elevation below the first elevation such that a water flow path is provided from the upflow filter vessel outlet over the top of the internal wall to the downflow filter vessel inlet.

4. A filter apparatus according to claim 1 in which the upper edge of the internal wall is at an elevation above the second elevation, at least one wall opening being defined through an upper region of the internal wall at an elevation below the first elevation such that a water flow path is provided from the upflow filter vessel outlet and through the wall opening to the downflow filter vessel inlet.

5. A filter vessel according to claim 4 including means for adjusting the size of the wall opening.

6. A filter vessel according to claim 4 including a first weir plate means positioned to cover a lower portion of the wall opening and a second weir plate means positioned to cover an upper portion of the wall opening.

7. A filter vessel according to claim 6 including means for adjustably mounting said first and second weir plate means to said internal wall such that said first and second weir plate means are movable to adjust the size of the wall opening.

8. A filter vessel according to claim 7 in which there are at least two such wall openings and in which a separate set of first and second weir plate means are provided for each of the wall openings, each of the first weir plate means being adjustably mounted so as to place them at the same elevation to equalize water flow through the wall openings.

9. A filter vessel according to claim 4 including flap gate means positioned at the downflow filter vessel side of the internal wall for selectively closing the wall opening.

10. A filter apparatus comprising:
an elongated hollow tank means;
internal wall means separating the interior of said tank means into a first upflow filter compartment and a second downflow filter compartment,
said first compartment having an upflow filter inlet for receiving raw water to be filtered, an upflow filter outlet located above the upflow filter inlet, and defining an upflow passageway for water from the upflow inlet to the upflow outlet;
an amount of buoyant particulate filter media in the upflow filter vessel sufficient to form a buoyant filtration bed in the upflow passageway between the upflow inlet and upflow outlet,
said second compartment having a downflow filter inlet, a downflow filter outlet for delivery of treated water from the filter apparatus, said downflow filter outlet being located below the downflow filter inlet, said second compartment also defining a downflow passageway for water from the downflow inlet to the downflow outlet;
an amount of nonbuoyant particulate filter media in the downflow filter vessel sufficient to form a nonbuoyant filtration bed in the downflow passageway between the downflow inlet and downflow outlet;
water flow pathway means providing a water pathway from the upflow filter outlet to the downflow filter inlet,
said first compartment having an upflow filter waste outlet at a first elevation which is above the elevation of the upflow filter outlet and said second compartment having a downflow filter waste outlet at a second elevation above the first elevation; and
drain means coupled to said upflow and downflow waste outlets, said drain means including waste trough means having a first spill over wall portion positioned within said upflow filter compartment at the first elevation, said waste trough means also including a second spill over wall portion positioned within said downflow filter compartment at the second elevation, said upflow filter waste outlet comprising said first spill over wall portion and said downflow filter waste outlet comprising said second spill over wall portion, said waste trough means extending from end to end of said tank, said waste trough means comprising a channel having first and second spaced apart upright side walls and a base, the side walls of said channel stepping up where the channel crosses the internal wall means such that the portions of the first and second side walls of the channel at the downflow filter vessel side of the internal wall are at the second elevation and the portions of the first and second side walls of the trough at the upflow filter vessel side of the internal wall are at the first elevation;
means for cleaning said buoyant filtration bed comprising means for selectively interrupting the flow of treated water from the downflow filter outlet while permitting the flow of influent water to the upflow filter inlet, means for injecting air into the first compartment to expand and scour the buoyant filtration bed, such that water within the first compartment rises and flows through said upflow filter waste outlet to flush deposited waste materials from said buoyant filtration bed to said drain means, partially treated water within the second compartment being conserved due to the positioning of the downflow filter outlet at the second elevation above the elevation of the upflow filter waste outlet; and
means for cleaning said nonbuoyant filtration bed comprising means for selectively delivering backflush water upwardly through the nonbuoyant media filtration bed, such that water within the second compartment rises and flows through said downflow filter waste outlet to flush deposited waste materials from said nonbuoyant filtration bed to said drain means.

11. A filter apparatus according to claim 10 in which the upper edge of the internal wall means is at an elevation above the second elevation, at least one wall opening being defined through an upper region of the internal wall means at an elevation below the first elevation such that the water flow pathway means passes through the wall opening of the internal wall means.

12. A filter vessel according to claim 11 including a first weir plate means positioned to cover a lower portion of the wall opening and a second weir plate means positioned to cover an upper portion of the wall opening.

13. A filter vessel according to claim 11 including means for selectively adjusting the size of the wall opening.

14. A filter vessel according to claim 11 including upright flap gate means positioned at the downflow filter vessel side of the internal wall means for selectively closing the wall opening at least during cleaning of the buoyant filtration bed to minimize the passage of dislodged waste materials from the first compartment through the wall opening to the second compartment.

15. A filter vessel according to claim 14 including flap gate seat means for receiving and positioning the flap gate means away from a vertical plane when said flap gate means is closed.

16. A filter system according to claim 10 in which said means for cleaning said buoyant filtration bed includes means for temporarily interrupting the flow of influent water to the upflow filter inlet after the water within the first compartment reaches a predetermined level, said means for injecting air comprising means for delivering air to the first compartment during a portion of the time which the flow of influent water is interrupted so as to form a slurry of dislodged deposited waste materials within the first compartment, and upon recommencement of the influent water flow to the upflow filter inlet waste materials are flushed through the upflow filter waste outlet to said drain means.

17. A filter system according to claim 10 in which said means for cleaning the nonbuoyant filtration bed includes bed surface cleaning means for washing the surface of such bed to dislodge waste materials therefrom.

18. A filter apparatus according to claim 10 in which the upper edge of the internal wall means is at an elevation below the first elevation such that the water flow pathway means passes over the top of the internal wall means.

19. A filter apparatus comprising:
an elongated hollow tank means;
internal wall means separating the interior of said tank means into a first upflow filter compartment and a second downflow filter compartment,
said first compartment having an upflow filter inlet for receiving raw water to be filtered, an upflow filter outlet located above the upflow filter inlet, and defining an upflow passageway for water from the upflow inlet to the upflow outlet;
an amount of buoyant particulate filter media in the upflow filter vessel sufficient to form a buoyant filtration bed in the upflow passageway between the upflow inlet and upflow outlet,
said second compartment having a downflow filter inlet, a downflow filter outlet for delivery of treated water from the filter apparatus, said downflow filter outlet being located below the downflow filter inlet, said second compartment also defining a downflow passageway for water from the downflow inlet to the downflow outlet;
an amount of nonbuoyant particulate filter media in the downflow filter vessel sufficient to form a nonbuoyant filtration bed in the downflow passageway between the downflow inlet and downflow outlet;
water flow pathway means providing a water pathway from the upflow filter outlet to the downflow filter inlet,
said first compartment having an upflow filter waste outlet at a first elevation which is above the elevation of the upflow filter outlet and said second compartment having a downflow filter waste outlet at a second elevation above the first elevation,
the upper edge of the internal wall means being at an elevation above the second elevation and at least one wall opening being defined through an upper region of the internal wall means at an elevation below the first elevation such that the water flow pathway means passes through the wall opening of the internal wall means;
a first weir plate means positioned to cover a lower portion of the wall opening and a second weir plate means positioned to cover an upper portion of the wall opening;
means for adjustably mounting said first and second weir plate means to said internal wall such that said first and second weir plate means are movable to adjust the size of the wall opening;
drain means coupled to said upflow and downflow waste outlets, said drain means including waste trough means having a first spill over wall portion positioned within said upflow filter compartment at the first elevation, said waste trough means also including a second spill over wall portion positioned within said downflow filter compartment at the second elevation, said upflow filter waste outlet comprising said first spill over wall portion and said downflow filter waste outlet comprising said second spill over wall portion;
means for cleaning said buoyant filtration bed comprising means for selectively interrupting the flow of treated water from the downflow filter outlet while permitting the flow of influent water to the upflow filter inlet, means for injecting air into the first compartment to expand and scour the buoyant filtration bed, such that water within the first compartment rises and flows through said upflow filter waste outlet to flush deposited waste materials from said buoyant filtration bed to said drain means, partially treated water within the second compartment being conserved due to the positioning of the downflow filter outlet at the second elevation above the elevation of the upflow filter waste outlet; and
means for cleaning said nonbuoyant filtration bed comprising means for selectively delivering backflush water upwardly through the nonbuoyant media filtration bed, such that water within the second compartment rises and flows through said downflow filter waste outlet to flush deposited waste materials from said nonbuoyant filtration bed to said drain means.

20. A filter apparatus comprising:
an elongated hollow tank means;
internal wall means separating the interior of said tank means into a first upflow filter compartment and a second downflow filter compartment, said internal wall means defining at least two spaced apart water flow openings through an upper region thereof;
said first compartment having an upflow filter inlet located below the water flow openings for receiving raw water to be filtered, and defining an upflow passageway for water from the upflow inlet to the water flow openings;
an amount of buoyant particulate filter media in the upflow filter vessel sufficient to form a buoyant filtration bed in the upflow passageway between the upflow inlet and water flow openings;
said second compartment having a downflow filter outlet for delivery of treated water from the filter apparatus, said downflow filter outlet being located below the water flow openings, said second compartment also defining a downflow passageway for water from the water flow openings to the downflow outlet;
an amount of nonbuoyant particulate filter media in the downflow filter vessel sufficient to form a nonbuoyant filtration bed in the downflow passageway between the water flow openings and downflow outlet;
drain trough means centrally positioned within an upper region of said tank and extending lengthwise across the internal wall means and from end to end of said tank, said drain trough means having a waste water outlet, first and second spaced apart upright side walls, and a base, the upper edges of the side walls at the upflow compartment side of the internal wall means being at a first elevation which is above the elevation of the water flow openings, the upper edges of the side walls located at the downflow compartment side of the internal wall means being at a second elevation which is above the first elevation, the upper edge of the internal wall means being above the second elevation;
means for cleaning said buoyant filtration bed comprising means for selectively interrupting the flow of treated water from the downflow filter outlet while permitting the flow of influent water to the upflow filter inlet, means for injecting air into the first compartment to expand and scour the buoyant filtration bed, such that water within the first compartment rises to the first elevation and flows over the trough side walls to the trough means to flush deposited waste materials from said buoyant filtration bed to said drain means, partially treated water within the second compartment being conserved because the water level within the second compartment is at an elevation below the second elevation; and means for cleaning said nonbuoyant filtration bed comprising means for selectively delivering backflush water upwardly through the nonbuoyant media filtration bed, such that water within the second compartment rises to the second elevation and flows over the trough side walls to the trough means to flush deposited waste materials from said nonbuoyant filtration bed to said drain means.

21. A filter apparatus according to claim 20 including a set of upper and lower weir plate means associated with each water flow opening, means for adjustably mounting said upper weir plate means to the internal wall means so as to cover an upper portion of the associated wall opening, and means for adjustably mounting said lower weir plate means to the internal wall means so as to cover a lower portion of the associated wall opening, said weir plate means being adjustable to vary the size of the associated water flow opening.

22. A filter apparatus according to claim 21 including flap gate means positioned within the downflow filter compartment, one such means being associated with each water flow opening, for selectively closing the associated water flow opening at least during cleaning of the buoyant filtration bed to minimize the passage of dislodged waste materials from the first compartment through the associated water flow opening to the second compartment.

23. A method of filtration of water comprising:
providing an upflow filter vessel that has
a. an upflow filter outlet, and
b. an upflow filter vessel distribution outlet at an elevation which is above the elevation of the upflow filter outlet;

forming a buoyant filtration bed by positioning an amount of buoyant particulate filter media in the upflow filter vessel;

providing a downflow filter vessel that has
a. a downflow filter inlet coupled to the upflow filter outlet,
b. a downflow filter outlet, and
c. a downflow vessel distribution outlet;

forming a nonbuoyant filtration bed by positioning an amount of nonbuoyant particulate filter media in the downflow filter vessel;

providing a distribution vessel which communicates with the distribution outlets;

cleaning an influent stream of water by flowing the water upwardly through the buoyant filtration bed and then flowing the water downwardly through the nonbuoyant filtration bed;

cleaning the upflow filter vessel by selectively closing the downflow filter outlet to maintain the level of liquid in the downflow filter vessel, expanding the buoyant filtration bed to release solids trapped in the buoyant filtration bed during filtration, and flowing buoyant filtration bed cleaning water upwardly through the buoyant filtration bed to carry the released solids away from the upflow filter vessel via the upflow filter vessel distribution outlet, and the distribution vessel;

cleaning the downflow filter vessel by selectively expanding the nonbuoyant filtration bed to release solids trapped in the nonbuoyant filtration bed during filtration, and flowing nonbuoyant filtration bed cleaning water upwardly through the nonbuoyant filtration bed to carry the released solids away from the downflow filter vessel via the downflow filter vessel distribution outlet, and the distribution vessel.

24. The method of claim 23 further comprising providing the downflow vessel distribution outlet at an elevation which is above the elevations of the downflow filter inlet and the upflow filter vessel distribution outlet.

* * * * *